United States Patent Office 2,835,567
Patented May 20, 1958

2,835,567

METHOD OF PRODUCING GRANULAR REFRACTORY METAL

Oswin Burr Willcox, New Castle, Del., assignor to E. I. du Pont de Nemours and Company, Wilmington, Del., a corporation of Delaware No Drawing. Application November 22, 1954
Serial No. 470,540

6 Claims. (Cl. 75—84.1)

This invention relates to the production of fourth group metals, and more particularly to improved processes for their preparation in granular form. More specifically, it relates to titanium metal production in the form of a loosely coherent granular mass.

The production of titanium metal in massive, sponge-like form is common procedure in the industry. This product is obtained by reacting liquid magnesium and titanium tetrachloride under an elevated temperature and requires intensive, expensive processing to remove the product from the reaction vessel and break it into suitable size for the subsequent metal working steps. Various processes have been proposed for producing the metal in the form of granules, crystals, and particles of various shapes, small lump, or of limited sponge size. Among those proposed are those wherein the amount of reactants active within a reaction zone are controlled to produce small product lumps; vigorous agitation of the reaction system is resorted to for breaking up the sponge formation into smaller lumps or particles; and multiple small batch size units are employed to control the unit size of the sponge.

Considerable difficulties are encountered in adapting these proposals for producing titanium metal, including undesirably low yields per unit size of reactor due to the spacing required for each reaction unit so that it will not cooperate with an adjacent one to form a massive sponge; unduly large amounts of power are required to agitate and shear the metal product with objectionable formation of metal product on the agitating equipment and reactor walls which clog, interrupt or stop the system completely; or necessitate the use of expensive, troublesome, highly mechanized apparatus to obtain separation of reacting units. Many other difficulties and disadvantages also exist in such prior procedures.

One of the major causes for the above difficulties arises from the presence of liquid magnesium in the reaction system. It wets the titanium metal product already produced, or when on the walls, agitator or other parts of the equipment, reacts to form titanium metal in place producing continuous bonding members to form a massive structure of titanium metal sponge.

I have found that this difficulty as well as the above and other disadvantages of prior titanium producing methods can be effectively overcome. Accordingly, it is among the objects of this invention to provide an improved process for attaining such objects as well as to provide novel methods for producing a loosely coherent granular mass of titanium metal; for eliminating the extensive effort required to produce useable sized titanium particles from the massive sponge of prior processes; for developing a process which will not require the expenditure of great amounts of power in agitation or mechanical sizing of product; and which eliminate the cause of the difficulties alluded to. Other objects and advantages of the invention will be evident from the ensuing description thereof.

These objects are accomplished by my invention which comprises preparing a loosely coherent granular mass of a group IV–A metal by reacting in an impurity-free reactor and under a non-deleterious atmosphere, solid reducing metal particles, such as solid magnesium particles, with a normally solid halide of said group IV—A metal dissolved in a molten alkali or alkaline earth salt, or mixtures thereof, regulating the amount of reducing metal and metal halide present in the reaction mixture so that substantially complete reduction of said halide is obtained and the reaction is effected while maintaining the temperature of the reaction system above the melting point of the molten salt solution but below the melting point of said reducing metal, and thereafter, recovering the resulting titanium metal product from the by-product salts.

In a more specific and preferred embodiment, the invention comprises obtaining a readily friable, granular mass of titanium metal by precipitating through means of solid magnesium particles the titanium values from a molten salt solution comprising a titanium subchloride having a chlorine to titanium atomic ratio of between 2 and 3, inclusive, dissolved in sodium chloride and magnesium chloride, during the precipitation reaction maintaining the temperature of said solution above the melting point of the salts present in the reaction mixture and below 650° C., regulating the amounts of magnesium and titanium subchloride present in the reaction mixture so that on completion of the reaction not over 10% excess of either reactant will be present, draining the residual molten salts from the resulting solid titanium metal product mass and recovering said titanium metal from the by-product salts.

The invention embodies my discovery that if a solid metal halide, especially a titanium subcholride, is present in a salt melt and reacted with particles of a solid reducing metal, particularly magnesium without at any time having all of said particles or at least the major portion thereof reaching or exceeding the melting point of said reducing metal, the resulting titanium will be in the form of crystals so loosely interlaced that no strong bonding attachment will exist between titanium derived from two adjacent magnesium particles, and that, in consequence, no continuous, strong agitation during reaction will be required and only brief agitation at the conclusion of the reaction will be necessary to obtain a mobile titanium slurry, should that be desired, or only a small amount of energy need be expended to remove the loosely coherent titanium mass from the reaction vessel.

To a clearer understanding of the invention, the following illustrative examples are given. These are not to be construed as in limitation of its underlying principles and scope.

*Example I*

A salt melt containing NaCl and $MgCl_2$ in the molar ratio of 2/1 was combined with another melt containing 20% Ti (as $TiCl_{2.66}$) and sodium chloride, to yield a melt containing 5.2% titanium (as the subchloride). Seventy grams of this melt and a 2.8 gram cube of magnesium were heated together in a small iron crucible free of deleterious impurities at 614–626° C. for 3¼ hours and then brought rapidly to room temperature. The solid product and by-product mass was removed easily from the crucible, crushed by a few light hammer blows and leached in a 5% nitric acid solution. All of the titanium subchloride had reacted and excess magnesium present remained in the form of a cube. The titanium product consisted of fine crystals and some very soft sponge lumps. The screen analysis of such product was as follows:

| Mesh | | Percent of Total |
|---|---|---|
| +20 | | 20.4 |
| −20 | 40 | 0.6 |
| −40 | 60 | 2.3 |
| −60 | 100 | 4.9 |
| −100 | 200 | 13.5 |
| −200 | 325 | 20.0 |
| −325 | | 38.3 |

The original leached material was almost entirely in the form of +20 aggregates of interlaced crystals but these reduced in size by brushing with a small horsehair brush while screening to the above distribution.

*Example II*

The procedure of Example I was duplicated in general with the following changes being made in the reactants charged to the iron crucible: The magnesium reductant consisted of 4 cubes of magnesium of about 2 grams each and the salt consisted of 206.75 grams of a salt melt consisting of sodium chloride, magnesium chloride and titanium dichloride containing 3.5% titanium as the subchloride. This charge was heated and reacted at a temperature below 650° C. after which the product mass was heated to about 660° C. and agitated with a ⅛" wire T shaped agitator. The product mass was then cooled to room temperature and leached with 5% nitric acid to produce a leached titanium metal product containing many soft lumps of about 4–20 mesh in size with some fines. When screened using the above brush method, the product analyzed approximately the same as the product of Example I.

*Example III*

In this larger scale operation the reaction vessel consisted of a cylindrical conical bottomed liner of thin steel with a volume of about 60 cubic feet disposed within a reactor equipped for heating and vacuum operation. An overflow line at the top of the liner was carried through the reactor shell by temporary welding. This overflow line led to a heat exchanger and then to a T fitting where a melt of titanium dichloride and sodium chloride having a concentration equivalent to 20% titanium could be injected and thereafter introduced at the conical bottom of the liner by a pump. 3000 lbs. of magnesium metal in the form of 1½" lengths of 1" diameter rod were charged to the liner and the system evacuated and heated to 600° C. The system was then allowed to fill with a melt consisting of sodium chloride and magnesium chloride in a molar ratio of 2/1 heated to 600° C. Salt circulation was started and the titanium dichloride containing melt was injected therein at a rate sufficient to react all of the magnesium in about six hours. Clear salt overflowed the liner and a volume equivalent to the titanium chloride was diverted to disposal before the main stream entered the heat exchanger where the effluent salt was cooled to 600° C. The volume of circulating salt was controlled to give an effluent temperature of less than 645° C. When all the magnesium had reacted the system was purged with clear salt and then drained from the bottom of the reactor with the free space being filled with an inert gas, argon. The remaining salt was distilled at 1000° C. and 5 microns' pressure. From this operation, 6000 lbs. of pure titanium metal, virtually free of magnesium and salt were obtained. It was in a form readily removable from the liner and was reduced to a size suitable for feed to a melting furnace. A sample of this material melted in an arc furnace gave hardness and other property values showing it to be useful for all types of titanium metal commercial applications.

The preferred titanium subchloride reactant employed herein can be obtained from various sources, such as a solution of the pure subchlorides in molten alkali (sodium, potassium, lithium) or alkaline earth (barium, calcium, strontium, etc.) chloride salts; by partial reduction of titanium tetrachloride with an alkali metal (sodium, potassium, lithium); by the partial reduction of titanium tetrachloride with hydrogen and absorption of the subchloride in an alkali or alkaline earth chloride; by bubbling titanium tetrachloride into an electrolytic cell, utilizing alkali and alkaline earth chlorides as an electrolyte, etc. Preferably, rather dilute solutions of titanium subchlorides in these molten chloride salts are used, solutions containing less than about 10% titanium being most preferred. The titanium subchloride in such molten salt solutions has an atomic ratio of chlorine to titanium between 2 and 3, inclusive. Of especial applicability are titanium subchloride-alkali metal chloride reactants having titanium subchlorides with chlorine to titanium atomic ratios between 2.5 and 2.7. These can be obtained by the partial reduction of titanium tetrachloride with sodium metal.

Although titanium comprises a preferred metal for production from a sub-halide thereof under the invention, preparation is also contemplated of other metals in Group IV–A of the Periodic Table, including those of zirconium, hafnium and thorium, from solutions of normally solid, non-volatile halides of such metals, e. g., chlorides, iodides and bromides. Examples of such additionally useful metal halides include $ZrCl_4$, $ZrBr_4$, $ZrI_4$ or the various subhalides of these zirconium compounds: $ThCl_4$, $ThBr_4$, $HfCl_4$, and the like. As in the instance of the titanium sub-halide, these are employed dissolved in a molten alkali metal (sodium, potassium, lithium) halide (chloride, bromide, iodide), with the reaction being carried out while the molten salt is below the melting point of the solid reducing metal employed in the process.

Again, while solid magnesium comprises a preferred type of useful reducing metal reactant, other alkaline earth metals, including those of calcium, barium, and strontium or mixtures thereof are also contemplated for use. The latter three are not presently economically as attractive for use due to the greater availability and low price of magnesium, but their employment enables one to operate the process at higher temperatures due to the higher melting points of these alkaline earth metals. For example, calcium melts at 751° C., strontium at 771° C., and barium 717° C. These higher melting points permit operation of the reduction step at a temperature above 650° C., the melting point of magnesium, and to about 771° C., the M. P. of strontium. It is critical to the process that the reaction system temperature shall not rise above the melting point of the alkaline earth, including magnesium, reducing metal utilized. Within this limitation, for the preferred reducing metal magnesium, the reaction system overall temperature is maintained at less than 650° C., with the lower temperature limit being above the melting point of the salt system involved so as to insure that the reaction shall be between solid magnesium and the titanium subchloride or other metal halide reactant dissolved in the molten salts. Preferably, reaction temperatures ranging from 550° C. to 650° C. are utilized. The melting point of the molten salt system can be altered by changing the constituent amounts, low melting compositions operate near eutectic compositions. Sodium chloride is the preferred alkali metal halide, but as noted, other alkali metal chlorides are also operable. The alkaline earth chloride used is preferably the same alkaline earth as is employed to reduce the subchloride.

The temperature of the reaction system may be controlled by regulating the amount of reaction taking place by controlling the rate of addition of reactants, by changing the concentration of titanium subchloride, by exterior cooling, by heat exchange using additional molten salt as a heat acceptor or by combinations of such means.

The presence of the molten salt is beneficial because it serves as a heat sink to level out temperatures.

The only agitation involved in the reduction reaction comprises that required to bring together the reactants, such as, for example, the flowing of the titanium subchloride solution into and close to the solid magnesium reducing agent, as illustrated in Example III. A larger amount of agitation can be utilized at the conclusion of the reduction reaction if desired to mobilize the titanium metal crystalline product and allow it to be removed with the residual molten salts from the reaction system.

The present invention affords production of a metal product, especially titanium which is in a form rendering it desirably useful directly without expending the comminuting energy heretofore required by prior sponge type producing processes. The reduction reaction product mass can be readily purified by recourse to conventional volatilization of by-products, vacuum distillation, or leaching procedures and techniques.

I claim as my invention:

1. A process for preparing a loosely coherent granular mass of a group IV-A metal selected from the group consisting of titanium, zirconium, hafnium and thorium, which comprises reacting in a reaction vessel free of deleterious impurities, solid particles of an alkaline earth reducing metal with a non-volatile halide of said group IV-A metal dissolved in a molten salt composition having a melting point below that of said reducing metal and being selected from the group consisting of an alkali and alkaline earth metal halide and mixtures thereof, regulating the amounts of alkaline earth metal and group IV-A metal halide present so that substantially complete reduction of said group IV-A metal halide in a molten salt bath is obtained, throughout the reaction, maintaining a temperature of reaction above the melting point of said molten salt bath but below the melting point of said reducing metal, and recovering the resulting product from the reaction by-product salt.

2. A process for preparing titanium metal in loosely coherent, granular form, comprising reacting in a reaction vessel free of deleterious impurities, solid particles of an alkaline earth metal reducing agent with a titanium subchloride dissolved in a molten alkali-alkaline earth metal halide salt bath mixture having a melting point lower than the melting point of said metal reducing agent, effecting said reaction at a temperature above the melting point of said salt mixture and below the melting point of said reducing agent metal, regulating the amount of reducing metal and titanium subchloride present in said salt mixture so that a substantially complete reduction of said subchloride in said bath will be effected, and recovering the resulting titanium metal from the reaction by-product salts which form.

3. A process for preparing a loosely coherent granular mass of titanium metal comprising reacting, in a reaction vessel free of deleterious impurities, solid magnesium metal particles with a titanium subchloride dissolved in a molten salt bath mixture consisting of alkali and alkaline earth metal chlorides having a melting point below 650° C., regulating the amounts of magnesium and titanium subchloride reactants present to obtain a substantially complete reduction of said subchlorides in said bath, throughout the reaction maintaining the temperature of the reactants above the melting point of said chlorides salt mixture but below 650° C., and recovering and separating the resulting titanium metal from the by-product salts reaction products.

4. A process for preparing a loosely coherent granular mass of titanium metal which comprises charging solid magnesium metal particles to a reaction vessel and freeing said vessel of deleterious impurities, separately charging to said vessel for reaction with said magnesium, titanium subhalide having a halogen to titanium atomic ratio of between 2 and 3, inclusive, dissolved in a molten salt bath composition having a melting point below the melting point of magnesium and being selected from the group consisting of alkali and alkaline earth metal halides, regulating the amount of titanium subhalide added to obtain in the reaction substantially complete reduction of said subhalide in said bath, regulating the temperature of the reaction system to maintain said salt composition molten and said mangesium metal in solid state, draining molten salts from the resulting solid titanium metal on completion of said reaction and recovering and separating the titanium metal from the reaction by-product salts.

5. A process for preparing titanium metal comprising precipitating titanium as a loose, granular mass from a molten salt solution of titanium subchloride, having a chlorine to titanium atomic ratio between 2 and 3 inclusive, in a molten sodium chloride and magnesium chloride bath having a melting point below 650° C., by reacting said solution with solid magnesium particles at temperatures maintained between 550° and 650° C. throughout the reaction, regulating the amounts of subchloride and magnesium reactants present to obtain not over a 10% excess of either reactant on completion of the reduction reaction, and recovering the titanium metal product from the reaction by-product salts.

6. A process for preparing a friable, granular mass of titanium metal which comprises reacting solid finely divided magnesium with the titanium values present in a molten salt solution of a titanium subchloride, having a chlorine to titanium atomic ratio of between 2 and 3, inclusive, dissolved in molten sodium chloride and magnesuim chloride bath having a melting point below 650° C., throughout the reduction reaction maintaining the temperature of the reactants above the melting point of the mixed sodium chloride-magnesium chloride salts and less than 650° C., regulating the amounts of magnesium and titanium subchloride added to and present in the reaction mixture so that at completion of the reaction not over a 10% excess of either reactant remains, draining the molten salts from the final, solid titanium metal product mass obtained, and separating said titanium metal product from the reaction by-product salts.

References Cited in the file of this patent

UNITED STATES PATENTS

| 2,586,134 | Winter | Feb. 19, 1952 |
| 2,607,674 | Winter | Aug. 19, 1952 |
| 2,647,826 | Jordan | Aug. 4, 1953 |
| 2,670,270 | Jordan | Feb. 23, 1954 |

FOREIGN PATENTS

| 686,845 | Great Britain | Feb. 4, 1953 |
| 697,530 | Great Britain | Sept. 23, 1953 |
| 1,069,706 | France | Feb. 17, 1954 |